(12) United States Patent
Whang

(10) Patent No.: US 10,085,467 B2
(45) Date of Patent: Oct. 2, 2018

(54) PRODUCTION OF ALKALINE SPRING WATER

(71) Applicant: SANG BEVERAGES, LLC, Miami, FL (US)

(72) Inventor: Peter John Whang, Kennesaw, GA (US)

(73) Assignee: SANG BEVERAGES, LLC, Boca Raton, FL (US)

( * ) Notice: Subject to any disclaimer, the term of this patent is extended or adjusted under 35 U.S.C. 154(b) by 17 days.

(21) Appl. No.: 14/998,871

(22) Filed: Feb. 24, 2016

(65) Prior Publication Data

US 2017/0238581 A1    Aug. 24, 2017

(51) Int. Cl.
| | |
|---|---|
| A23L 2/52 | (2006.01) |
| A23L 2/70 | (2006.01) |
| C02F 1/66 | (2006.01) |
| C02F 1/32 | (2006.01) |
| C02F 1/78 | (2006.01) |
| C02F 1/68 | (2006.01) |
| C02F 9/00 | (2006.01) |
| C02F 103/02 | (2006.01) |
| C02F 1/44 | (2006.01) |

(52) U.S. Cl.
CPC ......... *A23L 2/52* (2013.01); *C02F 1/32* (2013.01); *C02F 1/66* (2013.01); *C02F 1/685* (2013.01); *C02F 1/78* (2013.01); *C02F 9/00* (2013.01); *C02F 1/441* (2013.01); *C02F 2103/02* (2013.01); *C02F 2209/001* (2013.01); *C02F 2209/003* (2013.01); *C02F 2209/055* (2013.01); *C02F 2209/06* (2013.01); *C02F 2209/07* (2013.01); *C02F 2209/10* (2013.01)

(58) Field of Classification Search
CPC .......... C02F 1/66; C02F 2103/02; C02F 5/00; C02F 1/32; C02F 1/78; C02F 1/441; C02F 2209/055; C02F 2209/06; C02F 2209/07; C02F 2209/10; A23L 2/52
USPC .......................................................... 426/66
See application file for complete search history.

(56) References Cited

U.S. PATENT DOCUMENTS

| | | |
|---|---|---|
| 5,306,511 A | 4/1994 | Whang |
| 5,849,346 A | 12/1998 | Hornack |
| 6,572,902 B2 | 6/2003 | Abramowitz |
| 2009/0101490 A1 * | 4/2009 | Thiers .................... B01D 1/305 202/166 |
| 2009/0202687 A1 * | 8/2009 | Griego ...................... A23L 2/52 426/238 |
| 2012/0145643 A1 * | 6/2012 | Pandya .................. B01D 21/01 210/705 |

FOREIGN PATENT DOCUMENTS

| | | | |
|---|---|---|---|
| CN | 103936202 | * | 7/2014 |
| JP | 58074610 | * | 5/1983 |
| JP | 2002018439 | * | 1/2002 |

* cited by examiner

*Primary Examiner* — Kelly J Bekker
(74) *Attorney, Agent, or Firm* — Dickinson Wright PLLC

(57) ABSTRACT

A process is provided for producing a spring water product having a consistent pH, sodium concentration, and potassium concentration. A spring water source is separated into the first spring water portion and a second spring water portion. The first spring water portion is purified. Each portion is tested in increments for the amount of an alkaline formulation needed to attain a pH of at least about 10 and the predetermined potassium ion and sodium ion content. The purified spring water portion is combined with the second spring water portion that has not been purified to obtain a mixture. An alkaline formulation containing sodium hydroxide and potassium hydroxide is added to the resulting mixture to obtain the spring water product having at least a pH 10, a sodium concentration of at least 13 mg/l and a potassium content of at least 40 mg/l.

15 Claims, No Drawings

PRODUCTION OF ALKALINE SPRING WATER

BACKGROUND OF THE INVENTION

The present application relates to the production of alkaline spring waters having a pH of at least about 10 and a designated potassium and sodium ion content from one or more spring water sources. One objective is to produce alkaline spring waters having substantially consistent properties such as taste and alkaline ion content. Another objective is to minimize the amount of alkaline formulation to be used to produce alkaline spring waters from fresh spring waters. Yet another objective is to minimize the use of additionally treated input spring water in producing the alkaline spring waters.

The blood stream of human beings has a pH of about 7.35 to about 7.45. This is maintained by the body but can be affected by the consumption of acidic beverages. Such acidic beverages include coffees, teas, juices, and sodas. If these beverages are consumed in excess a person's pH will be lowered. Also some foods also will lower a person's pH. The can be counteracted in part by the consumption of alkaline waters. The alkaline waters can be formed as an individual serving or can be in the form of bottled alkaline waters in 0.5 liter to 4 liter or more bottles or other containers. The forming of alkaline waters in individual servings is disclosed in U.S. Pat. No. 5,306,511 of Sang Wang and in U.S. Pat. No. 5,849,346 to Richard Hornack. In the techniques of these patents an alkaline formulation is added to each serving of water to produce the alkaline water. The alkaline formulations contain various inorganic substances. The product of alkaline water in larger volumes is set out in U.S. Pat. No. 6,572,902 to Abramowitz et al. The source water is filtered and purified to produce a highly purified water. It is then remineralized to produce an alkaline water. This remineralized water then undergoes an electrolysis step and is flowed to storage. It is taken from a storage tank and bottled as needed. The present processes for producing alkaline spring waters has several advantages over these processes of Abramowitz. As a first advantage not all of the source water needs to be purified. This is due in part to the source water being a spring water. Spring waters usually contain some minerals and usually will have fewer contaminants. A second advantage is that a remineralization step is not needed. A further advantage is that an electrolysis step is not needed. All of these advantages lowers the cost of producing the product alkaline waters and consequently lowers the cost of the product alkaline waters to the consumer.

BRIEF DESCRIPTION OF THE INVENTION

The invention comprises both the efficient and low cost processing of water from a single spring water source and the processing of waters from a plurality of spring water sources to produce alkaline waters with a consistent pH of at least about 10 and a consistent concentration of potassium ion and sodium ion, and the maintenance of this pH and potassium ion and sodium ion concentrations for an extended period of time.

The process for producing an alkaline spring water from spring water sources comprises a testing procedure for the spring water to determine the most efficient way to produce the product spring water. The desired pH of at least about 10 is achieved primarily through the addition of potassium ions and sodium ions. As noted herein, one objective is to achieve the pH of at least about 10 and a desired potassium ion and sodium ion concentration using a minimum amount of an alkaline formulation. This yields an alkaline spring water having a consistent taste over an extended period of time and which has a lower production costs.

The testing procedure for a single spring source comprises:

(a) selecting a source of spring water source and analyzing it at least for substances that create hardness and for total dissolved solids;

(b) separating the selected spring water source into at least two portions, a portion to be purified to form a purified portion and a portion not to be purified to form a non-purified portion;

(c) purifying at least the portion to be purified to remove both dissolved solids and any partially dissolved solids that create hardness to produce a purified spring water portion and retaining a non-purified spring water portion;

(d) preparing an alkaline formulation containing at least a known concentration of potassium ion and of sodium ion;

(e) adding the alkaline formulation to each portion of spring water in increments to achieve a pH of at least about 10 for each portion, a potassium ion concentration of at least about 35 mg/liter and a sodium ion concentration of at least about 10 mg/liter, and calculating the amount of alkaline formulation per equivalent amount of each portion of spring water to achieve the foregoing pH and potassium ion and sodium ion concentrations;

(f) calculating the amount of alkaline formulation needed to achieve a pH of at least about 10 and the foregoing potassium ion and sodium ion concentrations for blends of the purified spring water portion and the non-purified spring water portion using a minimum amount of alkaline formulation;

(g) choosing a blend of the purified spring water portion and the non-purified water portion to achieve a pH of at least about 10 and the foregoing potassium ion and sodium ion concentrations, using a minimum amount of the purified spring water portion;

(h) combining quantities of the purified water and non-purified water to yield the product water using the calculated quantity of alkaline formulation.

In step (c) the purification process includes a plurality of filters.

In step (c) the purification process optionally includes reverse osmosis.

In step (c) the purification process optionally includes ultra-violet radiation.

In step (c) the purification process optionally includes a treatment with ozone.

In step (d) the alkaline formulation contains potassium ions and sodium ions in the form of potassium hydroxide and sodium hydroxide in a weight ratio of potassium hydroxide to sodium hydroxide of 95/5 to 50/50, and preferably about 75/25;

In step (e) each of the purified portion and the non-purified portion preferably has a potassium ion content of at least about 40 mg/liter and a sodium ion content of at least about 13 mg/liter, In the above testing of the spring water source it will require less of the alkaline formulation in the purified spring water portion than in the non-purified spring water portion to reach the desired pH and potassium and sodium ion concentrations. This is the result of the non-purified portion having some ions that combine with some of the potassium and/or sodium ions of the alkaline formulation. One solution would be to use only purified spring water. However, this would significantly increase the cost of the product water. It also would affect the characteristic taste of the spring water. A solution is primarily to use non-purified spring water, add the amount of alkaline formulation to this amount of non-purified spring water, and add purified spring water to dilute competing ions in the non-purified water for the alkaline formulation and substantially achieve the desired ph of at least about 10 and the desired potassium and sodium ion concentrations. As needed fine adjustments can be made to the final alkaline water product by the addition of small amounts of the alkaline formulation. The alkaline water product will be produced in about 1000 to 10,000 liter quantities.

When the alkaline spring water product is from the same continuously flowing spring water source the above testing is not required for each batch. However, a periodic testing is required to maintain the quality and the desired pH and potassium and sodium ion concentrations in the product alkaline spring water source. However, if the spring water is from a different spring water source the above testing is required.

The above process is directed to processing water sources from a single spring water source. The spring water can be from different days or weeks, but it is from the same spring water source. Below is the system for producing alkalized spring water from two available spring water sources depending on the availability of at least one of the spring waters at a given time. However, there can be more than two spring water sources.

A system for providing alkalized spring water with an alkaline pH of at least about 10 from a plurality of spring water sources utilizes a testing procedure similar to that of a single spring water source. At any given time the product spring water can be a mixture of spring waters from more than one source. This testing process comprises:

(a) selecting a plurality of spring waters and analyzing each of the plurality of spring waters at least for substances that create hardness and for total dissolved solids;

(b) separating each of the selected spring waters into at least two portions;

(c) purifying at least one portion of each of the plurality of spring waters to remove dissolved and any partially dissolved solids to yield a purified spring water portion and a non-purified spring water portion;

(d) preparing an alkaline formulation containing at least a known concentration of potassium ion and of sodium ion;

(e) adding the alkaline formulation containing a known concentration of potassium ion and of sodium ion in increments to each portion of the spring water to achieve a pH of at least about 10, a potassium ion concentration of at least about 35 mg/liter and a sodium ion concentration of at least about 10 mg/liter;

(f) calculating the amount of alkaline formulation needed to achieve a pH of at least about 10 and desired potassium and sodium ion concentrations for blends of the purified waters and of the non-purified waters using a minimum amount of alkaline formulation;

(g) choosing a blend of a purified water and a non-purified water to be produced to achieve a pH of about 10 and the desired potassium ion and sodium ion concentrations using a minimum amount of purified spring water;

(h) combining quantities of the chosen purified water and non-purified water to yield the product spring water using the calculated quantity of alkaline formulation.

In step (c) the purification process includes a plurality of filters.

In step (c) the purification process optionally includes reverse osmosis.

In step (c) the purification process optionally includes ultraviolet radiation.

In step (c) the purification process optionally includes a treatment with ozone.

In step (d) the alkaline formulation contains potassium ions and sodium ions in the form of potassium hydroxide and sodium hydroxide in a weight ratio of potassium hydroxide to sodium hydroxide of 95/5 to 50/50, and preferably about 75/25;

In step (e) each of the purified portion and the non-purified portion preferably has a potassium ion content of at least about 40 mg/liter and a sodium ion content of at least about 13 mg/liter,

DETAILED DESCRIPTION OF THE INVENTION

There are a wide range of available spring waters sources. They have a wide range of various contaminants. Also they will have contents of ions that will interfere with the efficient production of alkaline waters, and in particular alkaline waters having a pH of at least about 10 and a desired potassium ion content of at least about 35 mg/liter and a sodium ion content of about 10 mg/liter. Various dissolved solids in spring waters can affect the amount of potassium ion and sodium ion that is needed to acquire a pH of at least about 10. Such a pH is needed for an effective alkaline water that maintains its alkalinity over an extended period of time and which has an appealing taste.

At the spring water source the spring water will undergo a filtering to remove large visible inorganic and organic solids. These include fragments of silica, various inorganic oxides and carbonates. Inorganic substances can be minute fragments of surface materials that enter the springs through various voids in the earth's surface.

The invention is directed to the efficient production of alkaline spring waters from the generally available spring water sources. The source spring waters can come from one spring water source or from a plurality of spring water sources. The efficiencies of the process are derived from not having to purify all of the water from a spring source and from being able to minimize the amount of a purified spring water portion of the spring water source, and being able to minimize the amount of the alkaline formulation that is required to produce the alkaline spring water product having the designated pH and potassium and sodium ion contents. Further, as noted, the spring waters can be from a plurality of springs which is described below. This provides an opportunity for increased efficiencies since a purified water from one spring can be combined with a purified or non-purified water from a different spring for greater efficiency. The end objective is to reach a pH of at least about 10, a desired potassium ion (KOH) content and a desired sodium ion (NaOH) content using a minimum amount of a purified spring water and a minimum amount of alkaline formulation. The alkaline formulation used to achieve a pH of at least about 10 is comprised primarily of NaOH and KOH ions. However, it can contain other ions such as buffers, and compounds that function to release potassium ions and sodium ions over an extended period of time to assist in maintaining the pH of at least about 10 and potassium and sodium ion contents over a period of time.

The process of alkalizing water from a single spring water source is set out in more detail in the following listing of processing steps:

The effluent water from the single spring is analyzed for hardness and total dissolved solids and divided into two portions. One portion undergoes a purification process. This removes various dissolved and partially dissolved solids that create hardness. Hardness can be created by carbonates. The other portion does not undergo a purification process (non-purified spring water). The purification steps include one or more filterings to remove particles of greater than about 0.0001 micron, an optional reverse osmosis treatment, an optional ultraviolet treatment, and an optional ozone treatment. Other purification techniques can be added as needed. The result is purified spring water. This purified spring water then is treated with an alkaline formulation. This alkaline formulation is comprised primarily of sodium ions and potassium ions and is used to raise the pH of the purified spring water to at least about 10. Preferred alkaline formulations are set out in U.S. Pat. No. 5,306,511 to Sang Y. Whang which is incorporated herein by reference. These can have a potassium ion to sodium lion percentage ratio of about 95/5 to 50/50 and preferably about 75/25. A higher potassium ion ratio to sodium ion ratio is preferred.

The alkaline formulation is added to 1 liter samples of each of the purified spring water and the non- purified spring water in set increments and the pH tested after the addition of each increment. The potassium ion and sodium ion contents may also be determined. The desired potassium ion concentration is about 35 mg/liter, and preferably about 40 mg/liter. The sodium ion concentration is about 10 mg/liter and preferably about 13 mg/liter. The amount of alkaline formulation needed to reach the pH of at least about 10 and the desired potassium and sodium ion concentrations is calculated for the purified spring water sample and for the non-purified spring water sample. An objective is to minimize the amount of alkaline formulation required to reach a pH of at least about 10 for a spring water product while using a combination of purified spring water and non-purified spring water. Purified spring water has a higher cost with the result that the use of a higher content of non-purified spring water decreases the final cost of the product spring water and is preferred, The product alkaline spring water will be a blend of the purified spring water and the non-purified spring water based on this testing. It is preferred to use a high content of lower cost non-purified spring water. This is the product alkaline water that is bottled and sold.

Based on this testing the spring water to be used for the product water the addition of the amount of alkaline formulation in the purified portion and the non-purified portion can be calculated for any amount of product alkaline water that is to be produced. The purified portion can be added containing the calculated amount of alkaline formulation or it can be added without the calculated amount of alkaline formulation and the amount of alkaline formulation added after its addition to the non-purified portion. That is, it is added to the mixture. Whether added separately to the purified portion of spring water or to the mixture after the addition of the purified portion to the non-purified portion the mixture that is to be the product water is tested for pH and for its potassium ion and sodium ion content and final adjustments made by adding more alkaline formulation. Also some additional purified portion and/or non-purified portion can be added as needed in making final adjustments in the product spring water.

This process is repeated periodically for a spring water source and definitely for any new spring water source. It is an objective to have a consistent alkaline spring water product. This is the case for spring water from a single source or from a plurality of sources. The above process can be extrapolated for use with a plurality of spring sources. It will now be described for a two spring water source. Spring water source A is divided into spring water portion A1 to undergo purification and a non-purified spring water portion A2. The portion A1 undergoes a particle filtering to remove the inorganic and organic particles, followed by optional reverse osmosis, UV light filtering and an ozone treatment. The second spring water source is likewise divided into a spring water to be purified water B1 and non-purified spring water B2. The water to be purified undergoes a filtering to remove inorganic and organic particles of greater than 0.0001 micron, an optional reverse osmosis treatment, a UV light filtering, and an optional ozone treatment. Additional purification techniques can be used. The alkaline formulation as described above is then added in increments to one liter samples of the purified spring waters A1 and B1 to determine the minimum amount of alkaline formulation needed to acquire a pH of at least about 10 for each of the purified spring waters A1 and B1. This is repeated for each of the non-purified spring waters A2 and B2. The optimum amount of purified spring waters A1 and/or B1 and non-purified spring waters A2 and/or B2 that should be mixed to produce a product that maximizes the use of non-purified waters A2 and B2 and minimizes the amount of alkaline formulation that is needed to achieve a pH of about 10 or more, a potassium ion content of at least about 35 mg/liter and most preferably at least about 40 mg/liter and a sodium ion content of at least about 10 mg/liter and preferably about 13 mg/liter is calculated. The mixtures can be any of A1-A2; A1-B2; B1-A2; or B1-B2. This is determined by the incremental addition of alkaline formulation to the purified spring waters A1 and B1 and to the non-purified spring waters A2 and B2. The most efficient combination is determined and then chosen and bottled as the alkaline water product.

This description of a plurality of spring water sources has been shown with two spring water sources. However, it can be extrapolated to three, four or more spring water sources. The procedures will be the same for each spring water source. However, there will be more mixing options to achieve the use of a maximum amount of non-purified water and a minimum amount of alkaline formulation. The number of spring water sources to be used will be determined by the volume of alkalized spring water product needed. Also for the health and stability of spring water sources it is advisable not to over draw water from a spring source. A spring source can efficiently deliver a certain amount of water per day. Springs get replenished over time and the draw rate from the spring should not exceed the replenishment rate of the spring.

I claim:

1. A process for producing a potable alkaline spring water product to be bottled having a pH of at least about 10 produced from a spring water comprising:
   (a) selecting a source of spring water and analyzing at least for substances that create hardness and for total solids;
   (b) separating the selected spring water into at least two portions, a first portion to be purified and a second portion not to be purified to form a non-purified spring water portion;
   (c) purifying the first portion to be purified to remove dissolved solids and partially dissolved solids that create hardness to produce a purified spring water portion;
   (d) preparing an alkaline formulation containing at least a predetermined concentration of potassium ions and of sodium ions;
   (e) adding the alkaline formulation to said purified spring water portion, said second spring water portion that has not been purified, or a blend of said purified spring water portion and second spring water potion that has not been purified in increments to achieve a pH of at least about 10, a potassium ion concentration of at least about 35 mg/l and a sodium ion concentration of at least 10 mg/l for said purified spring water, said second non-purified spring water portion, or a blend thereof, and calculating the amount of said alkaline formulation for said first purified spring water portion, second spring water portion that has not been purified or said blend to achieve said pH and potassium ion and sodium ion concentration for said first portion and said second portion;

(f) choosing a mixture of said purified spring water portion and said spring water portion that has not been purified to be mixed to achieve a pH of at least about 10, wherein at least one of the purified water portion or the non-purified spring water portion was treated in step e by the addition of said alkaline formulation, the mixture containing a mineral content and a higher content of the non-purified spring water than the purified spring water portion, whereby the addition of said alkaline formulation provides the pH of at least 10 in the potable alkaline spring water;

(g) blending the chosen mixture from step f to yield said potable alkaline spring water product of said purified spring water and said second spring water portion that has not been purified, where said potable spring water product has a pH of about 10, a potassium content of at least 35 mg/l and a sodium content of at least 10 mg/l.

2. A process as in claim 1 wherein step (e) said purified spring water portion and said second spring water portion that has not been purified have a potassium ion content of at least about 40 mg/liter and a sodium ion content of at least about 13 mg/liter.

3. A process as in step (d) of claim 1 wherein the alkaline formulation contains an alkaline component including a potassium ion-containing compound and a sodium ion-containing compound in a weight ratio of 95/5 to 50/50.

4. A process as in claim 3 wherein the alkaline formulation is added to the blend of said purified spring water portion and the second spring water portion that has not been purified.

5. A process as in step (c) of claim 1 which includes ultraviolet radiation.

6. A process as in step (c) of claim 1 which includes a treatment with ozone.

7. A process for providing a potable alkaline spring water to be bottled having a pH of at least about 10, a designated concentration of potassium ion and sodium ion from a plurality of spring water sources comprising:

(a) selecting a plurality of spring water sources and analyzing each of the plurality of spring water sources for at least substances that create hardness and for total dissolved solids;

(b) separating each of the selected spring water sources into at least two portions, a first spring water portion to be purified to form a purified spring water portion and second spring water portion not to be purified to form a non-purified spring water portion;

(c) purifying the first spring water portions of the plurality of spring waters to be purified to remove dissolved and partially dissolved solids and obtain purified spring water portions;

(d) preparing an alkaline formulation containing a predetermined concentration of potassium ion and sodium ion;

(e) adding the said alkaline formulation to said first portion and second portion of spring water to achieve a pH of at least 10, a potassium ion content of at least about 35 mg/l and a sodium ion content of at least about 10 mg/l and calculating the amount of alkaline formulation needed to attain a pH of at least about 10 and said potassium and sodium ion contents;

(f) choosing a blend of the purified spring water portions and non-purified spring water portions to achieve a pH of at least about 10 using a minimum amount of said alkaline formulation, the blend containing a higher amount of the non-purified spring water portions;

(g) combining the chosen blend of said purified spring water portions and said second spring water portions that have not been purified to obtain said potable alkaline spring water comprising said blend of said purified spring water portions and said second spring water portion that has not been purified wherein said blend has a mineral content and whereby the addition of said alkaline formulation produces said potable alkaline spring water of said purified spring water and second portion of spring water that has not been purified, having a pH of at least 10, a sodium concentration of at least 13 mg/l and a potassium concentration of at least 40 mg/l.

8. A process as in step (d) of claim 7 wherein the alkaline formulation contains potassium ions and sodium ions in the form of a potassium ion-containing compound and a sodium ion-containing compound in a weight ratio of 95/5 to 50/50.

9. The process as in step (e) of claim 7 which includes ultraviolet radiation.

10. The process as in step (e) of claim 7 which includes a treatment with ozone.

11. A process for producing a potable partially purified spring water product comprising the steps of:

analyzing a spring water source for water hardness minerals and dissolved solids content;

separating said spring water into a first spring water portion to be purified and a second spring water portion to not be purified;

purifying said first spring water portion to remove said dissolved solids and hard water minerals to obtain a substantially pure spring water portion;

combining said substantially pure spring water portion with said second spring water portion that has not been purified to form a mixture of said substantially pure spring water portion and said second spring water portion that has not been purified, where said second spring water portion is included in an amount greater than said substantially pure spring water portion and where said mixture has a mineral content; and adding a predetermined amount of an alkaline formulation to said mixture, wherein said alkaline formulation has an alkaline component containing sodium ions and potassium ions, and where said alkaline formulation is added to said potable mixture in an amount to obtain said partially purified spring water product, wherein said mixture of said substantially pure spring water and said second spring water portion that has not been purified has mineral content whereby the addition of said alkaline formulation to said mixture produces said potable alkaline spring water product having a pH of at least 10, a sodium concentration of at least 10 mg/l and a potassium concentration of at least 35 mg/l.

12. The process of claim 11, wherein said first spring water portion is purified by reverse osmosis.

13. The process of claim 11, wherein said alkaline formulation comprises potassium to sodium in a ratio of 95/5.

14. The process of claim 11, wherein said alkaline formulation comprises potassium to sodium in a ratio of 50/50.

15. The process of claim 11, wherein said alkaline formulation comprises potassium to sodium in a ratio of 75/25.

* * * * *